United States Patent
Kisielinski

(10) Patent No.: US 10,279,947 B2
(45) Date of Patent: May 7, 2019

(54) MULTI-LAYERED CONTAINER AND METHOD FOR PRODUCING IT

(71) Applicant: WITOPLAST KISIELINSCY SPOLKA JAWNA, Warsaw (PL)

(72) Inventor: Michal Kisielinski, Warsaw (PL)

(73) Assignee: WITOPLAST KISIELINSCY SPOLKA JAWNA, Warsaw (PL)

(*) Notice: Subject to any disclaimer, the term of this patent is extended or adjusted under 35 U.S.C. 154(b) by 236 days.

(21) Appl. No.: 15/119,368

(22) PCT Filed: Jun. 26, 2015

(86) PCT No.: PCT/IB2015/054831
§ 371 (c)(1),
(2) Date: Aug. 16, 2016

(87) PCT Pub. No.: WO2016/097885
PCT Pub. Date: Jun. 23, 2016

(65) Prior Publication Data
US 2017/0057684 A1    Mar. 2, 2017

(30) Foreign Application Priority Data
Dec. 19, 2014    (PL) .......................................... 410678

(51) Int. Cl.
*B65D 1/02* (2006.01)
*B32B 15/08* (2006.01)
(Continued)

(52) U.S. Cl.
CPC ............ *B65D 1/0215* (2013.01); *B29B 11/10* (2013.01); *B29B 11/14* (2013.01); *B29C 43/003* (2013.01);
(Continued)

(58) Field of Classification Search
CPC ...... B65D 11/02; B65D 11/04; B65D 1/0215; B65D 35/08; B65D 35/10; B65D 35/12
See application file for complete search history.

(56) References Cited

U.S. PATENT DOCUMENTS 3,307,738 A * 3/1967 Scheindel ............... B29C 53/36
                                                              220/678
3,660,194 A   5/1972 Hoffmann
(Continued)

FOREIGN PATENT DOCUMENTS

DE        1704117 A1     4/1971
EP     2 435 331 A1     4/2012
(Continued)

*Primary Examiner* — Stephen J Castellano
(74) *Attorney, Agent, or Firm* — Craft Chu PLLC; Andrew W. Chu

(57) ABSTRACT

The multilayer container includes a container body having a multilayer structure and a multilayer head of the container. The multilayer body of the container has at least one barrier layer connected, on one side, to at least one thermoplastic layer and heat sealed in a longitudinal overlapping joint formed of the edges of these layers. The body has its external surface covered with a polymeric coating, and the multilayer head of the container includes at least one non-metallic barrier layer connected, on one side, to at least one thermoplastic layer and is wholly extruded in the co-extrusion process. The essence of the invention is also a method for producing such a container.

9 Claims, 3 Drawing Sheets

(51) Int. Cl.

| | | |
|---|---|---|
| *B32B 27/08* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B29C 53/38* | (2006.01) | |
| *B32B 1/08* | (2006.01) | |
| *B32B 3/04* | (2006.01) | |
| *B65D 35/10* | (2006.01) | |
| *B65D 35/12* | (2006.01) | |
| *B29B 11/10* | (2006.01) | |
| *B29B 11/14* | (2006.01) | |
| *B29C 43/00* | (2006.01) | |
| *B29C 43/18* | (2006.01) | |
| *B29C 47/06* | (2006.01) | |
| *B29C 53/48* | (2006.01) | |
| *B29D 22/00* | (2006.01) | |
| *B32B 1/02* | (2006.01) | |
| *B32B 3/06* | (2006.01) | |
| *B32B 7/12* | (2006.01) | |
| *B32B 15/085* | (2006.01) | |
| *B32B 15/20* | (2006.01) | |
| *B32B 15/088* | (2006.01) | |
| *B32B 15/09* | (2006.01) | |
| *B29K 29/00* | (2006.01) | |
| *B29L 31/00* | (2006.01) | |

(52) U.S. Cl.
CPC ............ *B29C 43/18* (2013.01); *B29C 47/065* (2013.01); *B29C 53/382* (2013.01); *B29C 53/48* (2013.01); *B29D 22/003* (2013.01); *B32B 1/02* (2013.01); *B32B 1/08* (2013.01); *B32B 3/04* (2013.01); *B32B 3/06* (2013.01); *B32B 7/12* (2013.01); *B32B 15/08* (2013.01); *B32B 15/085* (2013.01); *B32B 15/088* (2013.01); *B32B 15/09* (2013.01); *B32B 15/20* (2013.01); *B32B 27/08* (2013.01); *B32B 27/306* (2013.01); *B32B 27/32* (2013.01); *B32B 27/325* (2013.01); *B32B 27/34* (2013.01); *B32B 27/36* (2013.01); *B65D 1/0246* (2013.01); *B65D 35/10* (2013.01); *B65D 35/12* (2013.01); *B29C 2043/189* (2013.01); *B29K 2023/06* (2013.01); *B29K 2029/00* (2013.01); *B29K 2995/0067* (2013.01); *B29K 2995/0069* (2013.01); *B29L 2031/7158* (2013.01); *B32B 2250/03* (2013.01); *B32B 2250/04* (2013.01); *B32B 2250/20* (2013.01); *B32B 2250/24* (2013.01); *B32B 2250/246* (2013.01); *B32B 2250/26* (2013.01); *B32B 2250/40* (2013.01); *B32B 2255/10* (2013.01); *B32B 2255/20* (2013.01); *B32B 2264/102* (2013.01); *B32B 2307/31* (2013.01); *B32B 2307/546* (2013.01); *B32B 2307/58* (2013.01); *B32B 2307/7242* (2013.01); *B32B 2307/7265* (2013.01); *B32B 2307/75* (2013.01); *B32B 2311/00* (2013.01); *B32B 2439/40* (2013.01); *B32B 2439/60* (2013.01)

(56) References Cited

U.S. PATENT DOCUMENTS

| | | |
|---|---|---|
| 5,292,034 A | 3/1994 | Keller |
| 5,618,365 A | 4/1997 | Rebeyrolle et al. |
| 2010/0047542 A1 | 2/2010 | Thomasset |
| 2015/0096957 A1* | 4/2015 | Etesse .................... B29C 49/02 215/355 |

FOREIGN PATENT DOCUMENTS

| | | |
|---|---|---|
| WO | 00 58076 A1 | 10/2000 |
| WO | 2013 088416 A1 | 6/2013 |

* cited by examiner

MULTI-LAYERED CONTAINER AND METHOD FOR PRODUCING IT

CROSS-REFERENCE TO RELATED APPLICATIONS

This is the national stage (Rule 371) of international application No. PCT/IB2015/054831 filed Jun. 26, 2015.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The object of the invention is a container for storing and dosing products, having a multilayer structure with barrier properties both in its body and head regions.

2. Description of Related Art Including Information Disclosed Under 37 CFR 1.97 and 37 CFR 1.98

A solution of the foldable tube, the body of which has a multilayer structure, and one of its layers may be constituted by a barrier layer, is known from documents DE 1704117 and EP2435331. The European document also discloses a method for producing the tube, comprising the steps of forming the tube from a sheet material, applying a thermoplastic cover and providing its body with a head. This method, in its essential extent, is also known from document U.S. Pat. No. 3,660,194.

A method for producing a tube with walls containing more than 60% by volume of a plastic material, and the tube obtained by this method are also known from document PL174839. A particularly important aspect of this invention is a method for obtaining a crimped head of the tube by folding and uniform spatial spreading of folds by means of a special tool.

In turn, a method for production a multilayer head of a tube, and the tube provided with such a head are known from document PL167102. The method disclosed in this document consists in single pressing in of newly introduced heated blanks of plastic material so that they form a multilayer head of the tube. However, its essence shows that each successive blank for preparing a subsequent layer will only be introduced and pressed in when the previously produced layer stably maintains its formed shape.

However, none of the documents known from the prior art discloses a container which, as a whole, therefore including both the body and head regions, would have barrier properties and the head of which would be produced using the co-extrusion process.

Consequently, none of the containers currently available on the market provides a proper protection of products placed therein against external factors, such as access of air and loss of moisture. Thus, the technical problem is constituted by pressing a multilayer barrier head, connecting structural layers to each other, as well as connecting the barrier head to a barrier body of the container.

Previously known and used methods for producing a multilayer head with barrier properties essentially consisted in single pressing in of individual layers, wherein the introduction of each subsequent layer was possible only when the previous layer had already been stably formed. In addition, it was necessary to use a special process for forming a covering for an outflow opening in the head. This method was associated with a number of inconveniences, was energy-intensive and time-consuming.

Another method for obtaining a tube with a multilayer head was not preferable either as it consisted in special crimping of a tubular section in the region of its free end in order to obtain the head of the tube. Consequently, it was not possible to obtain the head from a different material than the one used in the body of the tube.

However, regardless of the method used for producing the multilayer head, an important problem consisted also in connecting the layers to each other. Not all of the known and commonly used barrier materials could be connected to thermoplastic materials which form an outer and/or inner wall of the container. For example, it can be indicated that a barrier layer made of ethylene vinyl alcohol (EVOH) does not connect to typical thermoplastic layers by means of methods known so far. At the same time, a barrier layer of EVOH, due to its properties, should not be in direct contact with the product placed in the container; therefore it can be placed only in a sandwiched position between thermoplastic layers.

BRIEF SUMMARY OF THE INVENTION

The invention described in the present document solves the above problems.

Above all, the object of the invention was to create a universal container which may be of any shape and size and be provided with a head having a desired shape that could be reproduced while ensuring, at the same time, barrier properties over the entire surface of the container. Further, both the body and the head of the container have a multilayer structure, consisting of at least two layers, including one layer with barrier properties. An important aspect of the invention is also a method for producing a multilayer head of the container, carried out in the co-extrusion process, and a method for fixing the head to the body of the container.

Primary advantages of the invention are:
barrier properties over the entire surface of the container;
possibility of obtaining the container with the multilayer structure formed from hardly connectable layers;
simple method of moulding the multilayer head of the container;
obtaining the container head having a desired shape that can be reproduced;
simple method of connecting the barrier head of the container to the barrier body, without the need to use specially designed sealed moulds. The container according to the invention may have any shape and size. Furthermore, also the very body and the very head of the container may have various forms.

DETAILED DESCRIPTION OF THE INVENTION

Figure 1:
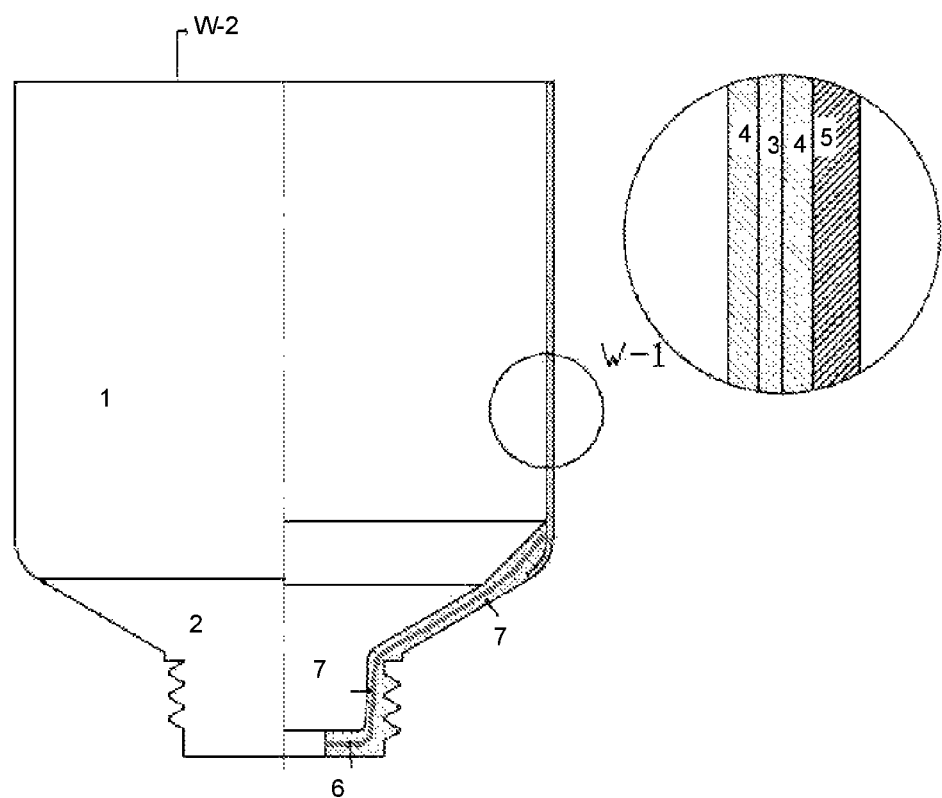
FIG. 1 is a cross-sectional view and an exploded cross-sectional view of a container of the present invention.

In a typical embodiment, the container body has the shape of a tube of an arbitrarily selected length, which is, via a flange, connected to a universal threaded head provided with a nut. The tube, having been filled with the product, is heat sealed at the lower part opposite to the head. The outer surface of the tube is coated with an additional layer of a polymer material, which allows its full use while applying an overprint. In the case of a container with a different shape than the tube, the underside part is provided with any bottom of the container.

The essence of the solution according to the invention is a multilayer container which comprises a container body having a multilayer structure and a multilayer head of the container, characterised in that the multilayer body of the container consists of at least one barrier layer connected, on one side, to at least one thermoplastic layer, heat sealed in a longitudinal overlapping joint formed of the edges of these layers, wherein the body has its external surface covered with a polymeric coating, and the multilayer head of the container comprises at least one non-metallic barrier layer connected, on one side, to at least one thermoplastic layer and is wholly extruded in the co-extrusion process.

Preferably, the body of the container is constituted of two thermoplastic layers between which the barrier layer is placed in a sandwiched position.

Preferably, the barrier layer comprises and/or consists of a metal and/or a plastic characterised by impermeability to gases and liquids.

Preferably, the barrier layer comprises and/or consists of an aluminum foil or ethyl vinyl alcohol (EVOH), or silicon oxides (SiOx), aluminum oxides (AlxOy), cyclic olefin copolymers (COC), polyamides (PA), polyesters.

Preferably, the container head is constituted of two thermoplastic layers between which the non-metallic barrier layer is placed in a sandwiched position.

Preferably, the non-metallic barrier layer is constituted by a layer of ethylene vinyl alcohol (EVOH).

Preferably, the thermoplastic layers comprise an admixture of a plastic constituting the non-metallic barrier layer or a plastic constituting the barrier layer, preferably an admixture of ethylene vinyl alcohol (EVOH), in an amount of 0.1 to 50% by weight, preferably 10% by weight. Preferably, the thermoplastic layers are constituted of a flexible, semi-rigid or rigid thermoplastic material.

Preferably, the thermoplastic layers can be made of the same or different materials.

The essence of the solution according to the invention is also a method for producing a multilayer container having barrier properties comprising steps of forming a body of the container from a web of thermoplastic material coated with a barrier layer, heat sealed in the area of a longitudinal overlapping joint formed of the edges of these layers, the obtained pipe is subjected to the coating process with a polymeric coating, and then is cut into sections of predetermined length, the thus obtained body of the container is slid onto a mandrel, a free end of which has the shape of the interior part of the head of the container, wherein the length of the body must be slightly greater than the length of the mandrel, whereupon the mandrel with the body is pressed into a die which has the shape corresponding to the external form of the container head and a punch forming an outlet opening of the head, and to which a plastic billet obtained in the co-extrusion process was previously introduced, which is followed by a step of moulding of the head with simultaneous heat sealing to the body, whereupon the obtained container is subjected to the cooling process.

Preferably, the plastic billet takes the form of a ring and is obtained in the co-extrusion process carried out at a temperature of 110 to 270° C. and at a pressure of 3 to 3.4 bar.

Preferably, the container, after filling its interior with the product, is heat sealed in its lower part or is provided with a bottom.

An important aspect of the present invention is the process of moulding and fixing the multilayer head of the container.

The multilayer head is obtained from the plastic billet obtained in the process of co-extrusion of several materials simultaneously. As a result of the process used, a multilayer plastic billet, preferably in the form of a ring, with a barrier layer disposed in the middle is obtained. Materials both of identical and various types and kinds may be subjected to this process. For example, this process is extremely efficient in the production of the head with the barrier layer of EVOH sandwiched between the layers of thermoplastic material. In the co-extrusion process, at least two nozzles which deliver a particular material to a common extrusion head are used. Wherein one nozzle can deliver two layers, e.g. two layers of the said thermoplastic material, and the other nozzle delivers a middle barrier layer, e.g. a barrier layer of EVOH. The co-extrusion process is carried out at a temperature of 110 to 270° C. and at a pressure of 3 bar for PE, and at 180 to 230° C. and at a pressure of 3.4 bar for EVOH.

The multilayer head is formed in the compression moulding process and based on an adequate flow of polymer inside the mould cavity during this process. Distribution of the polymer inside the mould is the result of properly selected plastic billet, mould geometry and flow velocity profile. The velocity profile is dependent on rheological properties of resin and on moulding parameters. The process of moulding the head comprises at least the following steps;

co-extrusion of the plastic billet;
precise positioning of the plastic billet in the mould cavity;
compressing the billet, moulding the element;
cooling the element;
removing the element from the mould.

Distribution of the polymer inside the element of compression moulding is not random and is controlled by a number of parameters, such as:

geometry of the billet;
geometry of a polymer dose from which the plastic billet is formed;
rheological properties of resin;
positioning of the billet.

In order to obtain a multilayer structure having appropriate barrier properties, size of the multilayer billet has to be appropriately selected so that the extrusion could be technically feasible.

During the compression, the billet flows in three directions. The velocity profile in the thickness of the layer is characterised by the maximum velocity in the middle of the stream and the minimum velocity at the wall. This profile shows that the propagation of particles depends on their position inside the three-dimensional stream.

During the extrusion, the polymer flows mainly from the centre toward the periphery of the flange. In a preferred embodiment as shown in FIG. 1, the multilayer biller is moulded from three layers consisting respectively of PE (layer A), EVOH (layer B) and PE (layer C). During the compression, layer B is folded symmetrically. At the same time, layer B propagates toward the periphery of the dose. The final position of barrier layer B during the compression process depends on its previous position in the billet. An appropriate modification of the ratio of layers A and C changes the final position of layer B in the dose. In order to increase the propagation of layer B, the amount of layer C should be increased.

The thermoplastic materials appropriate for moulding the thermoplastic layers of the container are polymeric materials. Polyolefin material is a particularly preferred thermoplastic material.

Furthermore, the thermoplastic layer may be also constituted by a mixture of HDPE with LDPE, preferably 80% of HDPE and 20% of LDPE, as well as a mixture of polyethylene with its random copolymer.

However, the present invention is not limited to the above-mentioned materials but includes any materials having flexible, semi-rigid or rigid properties which could constitute the thermoplastic layers of the container.

The materials appropriate for the formation of the barrier layer used in the moulding of the body and/or the head of the container are plastics, such as EVOH, polyester, polyamide (PA), cycloolefin copolymers (COC), silicon oxides (SiO), aluminum oxides (AlxOy), etc. The barrier materials for moulding the barrier layer of the body are also metals, such as aluminum.

The barrier layer of the body may be obtained by coating a thermoplastic material with a barrier material, e.g. with an aluminum foil, or formation of a separate barrier layer, e.g. of EVOH, and heat sealing thereof with the thermoplastic layer, or by co-extrusion.

It is particularly preferred when the thermoplastic layers of the container are admixtured with a material performing a barrier function, such as EVOH. Good results are obtained with the use of EVOH admixture in an amount of 0.1 to 50% by weight in relation to the polyethylene thermoplastic layer. This solution allows a good connection of the thermoplastic layers to the barrier one.

The multilayer containers with the barrier layer of EVOH have the physical properties of plastic containers (flexibility and ability to return to their original shape), and by addition of EVOH barrier they become resistant to penetration of undesirable substances and gases into the product. The barrier layer protects the product against external influences, such as UV radiation, air, humidity, as well as against oxidation of the product and volatilisation of substances outside the container, e.g. fragrance substances.

The materials appropriate for the formation of the adhesive layer are substances typically used as adhesives.

Figure 2:
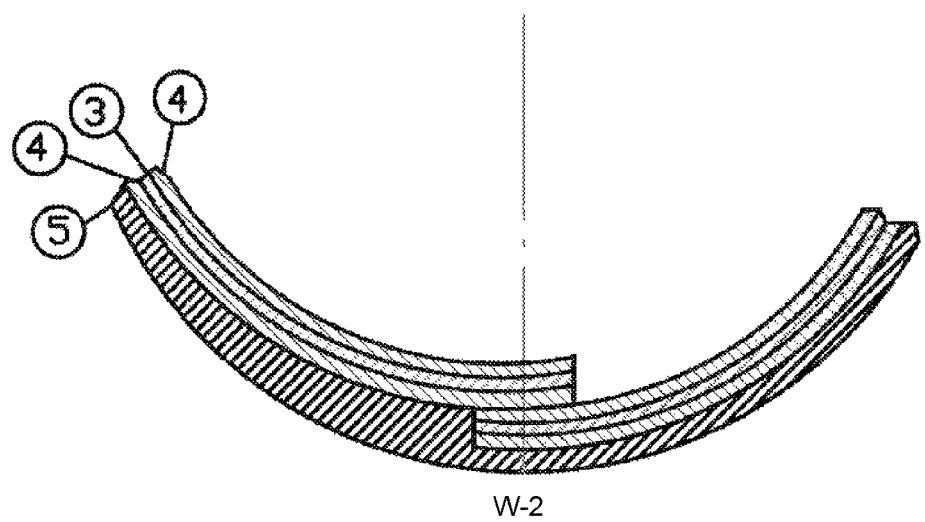
FIG. 2 is an isolated cross-sectional view, according to embodiments of the invention.
Figure 3:
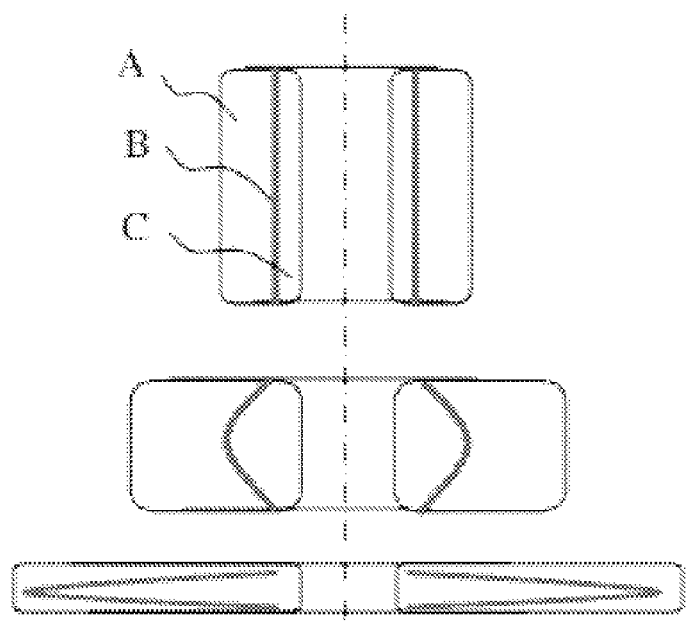
FIG. 3 is a schematic view of barrier layers of the container according to embodiments of the invention.

The solution according to the invention is further presented in an embodiment in the drawing in which FIG. 1 shows the container in cross-section with a clear indication of layers forming the container body (view W-I) and the container head, and FIG. 2 shows a cross-section illustrating an arrangement of the layers of the container body in a longitudinal overlapping joint, in turn FIG. 3 presents steps of propagation of the barrier layer in the plastic billet.

Example 1

The container according to the invention comprises a multilayer body 1 having the shape of a tube consisting of a thermoplastic outer layer, a thermoplastic inner layer and a barrier layer 3 arranged between them. The outer surface of the body is coated with a polymeric coating 5. A free section of the tube is equipped with a head 2 consisting of an outer thermoplastic layer, an inner thermoplastic layer and a non-metallic barrier layer 6 arranged between them. The layers forming the body 1 of the tube may be the same or different from those used in the structure of the head 2 of the tube. The head 2 is then connected to the body 1 of the tube, wherein the head 2 consists of an outlet part and a conical flange. The outer surface of the outlet part of the head has a threaded structure so that the head 2 may be provided with a nut.

Example 2

The body 1 of the multilayer container is formed from a web of flat-printed laminate. Wherein the laminate structure may consist of five layers (polyethylene-adhesive layer—barrier (e.g. aluminum, EVOH), adhesive layer—polyethylene).

The web of printed laminate, is formed into a roll of a desired diameter, heat sealed in a longitudinal overlapping joint, constituting overlapped edge regions of the laminate layers. The roll is then coated with a polymeric coating 5 and cut to a predetermined length. The resulting tube is heat sealed with a multilayer head, the structure of which can also consist of five layers (polyethylene-adhesive layer-barrier (e.g. aluminum, EVOH), adhesive layer—polyethylene), and its outer surface may be threaded. The last step is pushing or tightening of a selected nut.

Example 3

The process of formation of the container having the shape of a tube according to an embodiment can take place in such a way that the web of one thermoplastic layer coated, on its inner side, with an aluminum foil is formed into the shape of a pipe by heat sealing the edges of the layers. The body 1 of the container may be also constituted by a laminate of plastic layers connected to each other, including a polymeric outer layer, a polymeric inner layer and a middle barrier layer of a material with insulating properties, e.g. aluminum, EVOH, possibly also adhesive layers. The thus formed pipe is coated with a polymeric coating 5, e.g. of PE, and then is cut into sections of any length. Wherein the coating may be in the form of one or more layers, depending on the desired flexibility of the container body. The aim of coating the container body on its outer side is to provide it with a smooth, printable surface and to form its final shape.

The previously prepared container body is slid onto a mandrel, a free end of which has the shape of the interior part of the container head, wherein the length of the body must be slightly greater than the length of the mandrel.

In a next step, the mandrel together with the body is pressed into a die to which a previously prepared plastic billet obtained in the co-extrusion process is introduced. The die has the shape corresponding to the external form of the container head and a punch forming an outlet opening of the head. This process allows moulding of the head of any shape and thickness. The obtained container head has a typical narrowing having a diameter smaller than the diameter of the body and/or a moulded flange part which connects this narrowing to the container body.

Independently from the above embodiments, the container may also have a different, arbitrary shape, and the place of heat sealing can be substituted by a bottom of the container.

Thanks to the invention, the following surprising and remarkable results are obtained: the thermoplastic layer easily connects to the barrier layer by using an admixture of a barrier material in the material forming the thermoplastic layer; the material for moulding the multilayer head is obtained in a simplified manner, through the use of the co-extrusion process; —the multilayer head of the container is easily extruded in the die from a ready plastic billet obtained in the co-extrusion process and is fixed to the container body.

I claim:

1. A multilayer container, comprising:
   a container body having a multilayer structure; and
   a multilayer head,
   wherein said container body is comprised of at least one barrier layer connected, on one side, to at least one thermoplastic layer and heat sealed in a longitudinal overlapping joint formed of edges of the layers,
   wherein said container body has an external surface covered with a polymeric coating, and
   wherein said multilayer head comprises at least one non-metallic barrier layer connected, on one side, to at least one thermoplastic layer and is wholly extruded in the co-extrusion process.

2. The container according to claim 1, wherein said container body is comprised of two thermoplastic layers, and a barrier layer sandwiched between the two thermoplastic layers.

3. The container according to claim 2, wherein said barrier layer is comprised of at least one of a metal and a plastic, said barrier layer being impermeable to gases and liquids.

4. The container according to claim 3, wherein said barrier layer is comprised of at least one of an aluminum foil, ethyl vinyl alcohol (EVOH), silicon oxides (SiOx), aluminum oxides (AlxOy), cyclic olefin copolymers (COC), polyamides (PA), and polyesters.

5. The container according to claim 1, wherein said multilayer head is comprised of two thermoplastic layers and a non-metallic barrier layer sandwiched between the two thermoplastic layers.

6. The container according to claim 5, wherein said non-metallic barrier layer is comprised of a layer of ethylene vinyl alcohol.

7. The container according to claim 1, wherein thermoplastic layers comprise an admixture of a plastic forming at least one of group consisting of a non-metallic barrier layer and a plastic comprising a barrier layer being comprised of an admixture of ethylene vinyl alcohol, in an amount of 0.1 to 50% by weight.

8. The container according to claim 1, wherein thermoplastic layers are comprised of a flexible, semi-rigid or rigid thermoplastic material.

9. The container according to claim 1, wherein thermoplastic layers are comprised of the same or different materials.

* * * * *